(No Model.)

W. JONES.
PAPER CUTTER.

No. 339,895. Patented Apr. 13, 1886.

Witnesses
W<sup>m</sup> A. Lowe
Thos. Turner

Inventor
Willis Jones
By his Attorneys Roeder & Briesen

UNITED STATES PATENT OFFICE.

WILLIS JONES, OF NEW YORK, N. Y., ASSIGNOR TO GEORGE H. HYDE, OF SAME PLACE.

PAPER-CUTTER.

SPECIFICATION forming part of Letters Patent No. 339,895, dated April 13, 1886.

Application filed February 5, 1886. Serial No. 190,892. (No model.)

*To all whom it may concern:*

Be it known that I, WILLIS JONES, of the city of New York, county and State of New York, have invented a new and Improved Paper-Cutter, of which the following specification is a full, clear, and exact description.

This invention relates to a knife to be used for cutting paper along the folds, for opening envelopes, and for similar purposes.

The invention consists in the elements of improvement hereinafter more fully pointed out.

Figure 1:
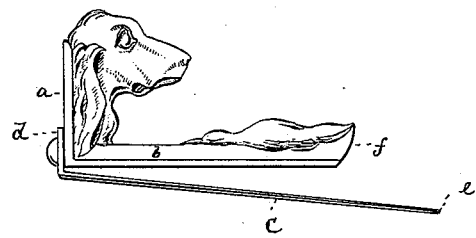
Figure 2:
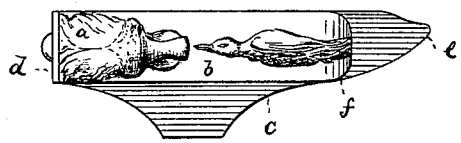

In the accompanying drawings, Figure 1 is a side view, and Fig. 2 a top view, of my improved paper-cutter.

The letter $a$ represents the upright arm or knob, and $b$ the horizontal arm of a handle, such arms being suitably ornamented.

$c$ is a cutting-blade placed below the lower face of the arm $b$ and turned up at its rear edge to form a lug, $d$, which is screwed to the arm $a$. At its front and sides the blade is entirely disconnected from the handle.

The blade $c$ is made of steel or other springing material, and is attached in such a manner that its forward edge diverges from the forward edge of arm $b$, as shown in Fig. 1.

The point $e$ of the blade $c$ projects beyond the end of arm $b$, and the cutting-edge of the blade is made of concavo-convex form and projects beyond the side of such arm. The front edge of arm $b$ is rounded, as shown at $f$.

In use the blade $c$ is slipped into the fold and pressure is brought to bear upon arm $b$. As the knife is advanced, this arm will bear down along its whole length upon the upper face of the paper, and act somewhat similar to a sad-iron in taking out creases. It will also prevent the knife from slipping out of the fold and cutting into the body of the paper. If desired, the whole device may be formed out of one piece.

I claim as my invention—

1. The combination of handle $b$ with spring-blade $c$, placed beneath the handle and attached to the same at its rear edge, all being so constructed that the forward end of the blade diverges from the forward end of the handle, substantially as specified.

2. The combination of the handle $b$, having rounded edge $f$, with blade $c$, placed beneath the handle and attached with its rear edge to the rear edge of the handle, the blade $c$ having point $d$, that projects beyond the front edge of the handle, substantially as specified.

WILLIS JONES.

Witnesses:
F. V. BREISEN,
ROB ROY.